(12) United States Patent  
Miura

(10) Patent No.: US 10,406,913 B2  
(45) Date of Patent: Sep. 10, 2019

(54) FUEL FILLER STRUCTURE CAPABLE OF USE WITH A FUEL FEEDING PIPE

(71) Applicant: HONDA MOTOR CO., LTD., Tokyo (JP)

(72) Inventor: Yusuke Miura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 16 days.

(21) Appl. No.: 15/626,660

(22) Filed: Jun. 19, 2017

(65) Prior Publication Data

US 2017/0361704 A1   Dec. 21, 2017

(30) Foreign Application Priority Data

Jun. 21, 2016  (JP) .................................. 2016-122664

(51) Int. Cl.
*B60K 15/04* (2006.01)
*B60K 15/03* (2006.01)

(52) U.S. Cl.
CPC .... *B60K 15/04* (2013.01); *B60K 2015/03256* (2013.01); *B60K 2015/03394* (2013.01); *B60K 2015/048* (2013.01); *B60K 2015/0429* (2013.01); *B60K 2015/0461* (2013.01)

(58) Field of Classification Search
CPC .............. B50K 15/03519; B50K 15/04; B50K 15/0403; B50K 15/035; B60K 2015/03256; B60K 2015/03276; B60K 2015/03296; B60K 2015/03394; B60K 2015/0429; B60K 2015/0461; B60K 2015/048
USPC .............................. 220/86.2, 86.1, 86.3, 86.4
See application file for complete search history.

(56) References Cited

U.S. PATENT DOCUMENTS

| 4,747,508 | A | * | 5/1988 | Sherwood | ........ B60K 15/03519 141/326 |
| 4,941,587 | A | * | 7/1990 | Terada | .................. B60K 15/04 220/746 |
| 4,966,299 | A | * | 10/1990 | Teets | ..................... B60K 15/04 123/516 |
| 5,186,220 | A | * | 2/1993 | Scharrer | ......... B60K 15/03519 137/39 |

(Continued)

FOREIGN PATENT DOCUMENTS

| JP | 2015-071408 A | 4/2015 |
| JP | 2017-149342 A | 8/2017 |

OTHER PUBLICATIONS

Japanese Office Action with English Translation dated Apr. 3, 2018, 6 pages.

*Primary Examiner* — Robert Poon
(74) *Attorney, Agent, or Firm* — Rankin, Hill & Clark LLP

(57) ABSTRACT

A fuel filler structure capable of use with a fuel feeding pipe prevents efficiency of sucking volatile fuel from being decreased during refueling even if a drain hole is formed, and includes: a cylinder that includes an opening and a connecting port; a first flap mechanism that is arranged near the opening of the cylinder and opens the opening when a nozzle is inserted; a drain hole that is formed in the cylinder and communicates inside the cylinder with outside; and a drain hole switching valve that opens and closes the drain hole, wherein the drain hole switching valve has a closing mechanism including a valve body that is pressed by the nozzle when the nozzle is inserted through the opening, so that the drain hole is closed.

5 Claims, 4 Drawing Sheets

(56) References Cited

U.S. PATENT DOCUMENTS

| | | | | |
|---|---|---|---|---|
| 5,415,827 | A | * | 5/1995 | Tomka ................ B29C 55/005 264/510 |
| 5,791,387 | A | * | 8/1998 | Palvolgyi ............... B60K 15/05 141/301 |
| 5,848,626 | A | * | 12/1998 | Kim ..................... B60K 15/035 141/348 |
| 5,921,424 | A | * | 7/1999 | Palvolgyi ............... B60K 15/04 141/301 |
| 6,092,685 | A | * | 7/2000 | Gruber ............. B60K 15/03504 137/588 |
| 6,102,234 | A | * | 8/2000 | Kremer ................ B60K 15/04 137/312 |
| 6,105,612 | A | * | 8/2000 | Schaar ................ B60K 15/035 123/519 |
| 6,367,520 | B1 | * | 4/2002 | Palvolgyi ............... B60K 15/04 141/289 |
| 7,726,363 | B2 | * | 6/2010 | Benjey ............... F02M 37/0082 141/198 |
| 8,960,473 | B2 | * | 2/2015 | Grun ............... B60K 15/03504 137/588 |
| 2002/0189691 | A1 | * | 12/2002 | Morinaga ........ B60K 15/03519 137/588 |
| 2009/0001077 | A1 | * | 1/2009 | Feichtinger ............ B60K 15/04 220/86.2 |
| 2009/0188582 | A1 | * | 7/2009 | Hagano ................. B60K 15/04 141/349 |
| 2015/0083720 | A1 | | 3/2015 | Kobayashi et al. |

\* cited by examiner

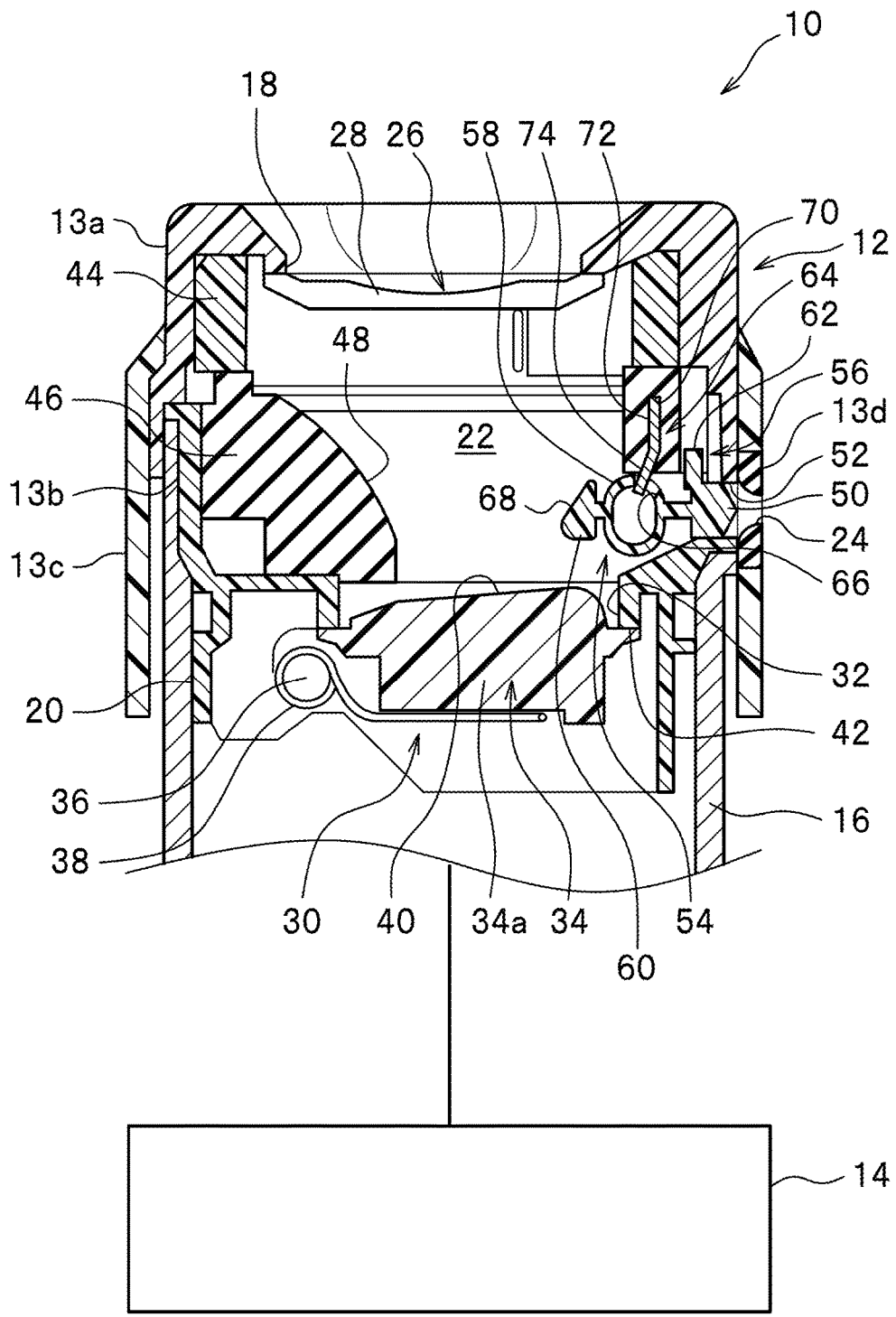

EMBODIMENT

COMPARATIVE EXAMPLE

FUEL FILLER STRUCTURE CAPABLE OF USE WITH A FUEL FEEDING PIPE

CROSS REFERENCE TO RELATED APPLICATION

This application claims the benefit of priority to Japanese Patent Application No. 2016-122664 filed on Jun. 21, 2016, the disclosures of all of which are hereby incorporated by reference in their entireties.

BACKGROUND OF THE INVENTION

Field of the Invention

The invention relates to a fuel filler structure capable of use with a fuel feeding pipe that communicatively connects a fueling port with a fuel tank.

Description of the Related Art

A vehicle such as a car equipped with an internal combustion engine includes a fuel feeding pipe that communicatively connects a fueling port for inserting a nozzle of a fueling gun, with a fuel tank which stores fuel therein. Also, in recent years, in order to improve the convenience during refueling, a so-called capless fuel filler structure has been employed that does not include a fuel cap conventionally arranged in the fueling port.

For example, Japanese Patent Application Publication No. 2015-71408 discloses a capless fuel filler structure. The fuel filler structure includes an outer cover in a cylindrical shape. A drain hole is formed in the outer cover. Water and dust entering into an inner space of the outer cover are discharged outside through the drain hole.

A refueling device at a gas station may have a suction mechanism that sucks volatile fuel into a tank at the gas station simultaneously with refueling, so as not to eject the volatile fuel into an ambient air during refueling.

When the refueling device having the suction mechanism is used for refueling, the capless fuel filler structure causes the ambient air to be simultaneously sucked through the drain hole which communicates with outside of the refueling device. Therefore, efficiency of sucking volatile fuel may be decreased.

SUMMARY OF THE INVENTION

In view of the problem above, the invention is intended to provide a fuel filler structure capable of use with a fuel feeding pipe that prevents efficiency of sucking volatile fuel from being decreased during refueling even if a drain hole is formed.

To solve the problem described above, the invention provides a fuel filler structure capable of use with a fuel feeding pipe including: a cylinder that includes an opening for inserting a nozzle of a fueling gun and a connecting port to which a fuel feeding pipe is connected for supplying fuel to a fuel tank; a flap mechanism that is arranged near the opening of the cylinder and opens the opening when the nozzle is inserted; a drain hole that is formed in the cylinder and communicates inside the cylinder with outside; and a drain hole switching valve that opens and closes the drain hole, wherein the drain hole switching valve has a closing mechanism that is pressed by the nozzle when the nozzle is inserted through the opening, so that the drain hole is closed.

According to the invention, in a case where volatile fuel is sucked during refueling, the closing mechanism is pressed by the nozzle of a fueling gun that is inserted through the opening, so that the drain hole is closed. As a result, even if the drain hole is formed, the invention prevents efficiency of sucking volatile fuel from being decreased during refueling.

Further, the closing mechanism includes a nozzle contact portion that abuts on an outer wall of the nozzle and a valve that is integrally formed with the nozzle contact portion, and the nozzle contact portion is displaced toward the drain hole by a pressing force of the outer wall of the nozzle when the nozzle is inserted through the opening, so that the drain hole is closed by the valve.

According to the invention, the nozzle inserted through the opening directly contacts the nozzle contact portion to displace a valve body during fueling, so that the drain hole switching valve is closed. With such a configuration of the invention, the drain hole switching valve is securely closed, and a manufacturing cost is reduced due to a fewer parts compared with a case of an indirect mechanism in which a valve body is displaced without being affected by a pressing force of a nozzle.

Still further, in the invention, the nozzle contact portion includes an inclined face that rises in an axial direction from a portion closest to the opening toward the connecting port.

According to the invention, since the nozzle contact portion includes the inclined face that rises in the axial direction from the portion closest to the opening toward the connecting port, the nozzle is not caught at the nozzle contact portion when the nozzle is inserted.

Yet further, the fuel filler structure further includes another flap mechanism that is arranged near the connecting port of the cylinder, wherein the another flap mechanism is pressed by the nozzle when the nozzle is inserted through the opening, to open an opening near the connecting port.

According to the embodiment, another flap mechanism arranged near the connecting port of the cylinder securely prevents dust and the like from entering into the fuel feeding pipe.

The invention provides a fuel filler structure capable of use with a fuel feeding pipe capable of preventing efficiency of sucking volatile fuel during refueling from being decreased even if a drain hole is formed.

BRIEF DESCRIPTION OF THE DRAWINGS

FIG. 1 is a partially omitted enlarged cross-sectional view of a fuel filler structure according to an embodiment of the invention;

DETAILED DESCRIPTION OF THE PREFERRED EMBODIMENTS

Figure 2A:
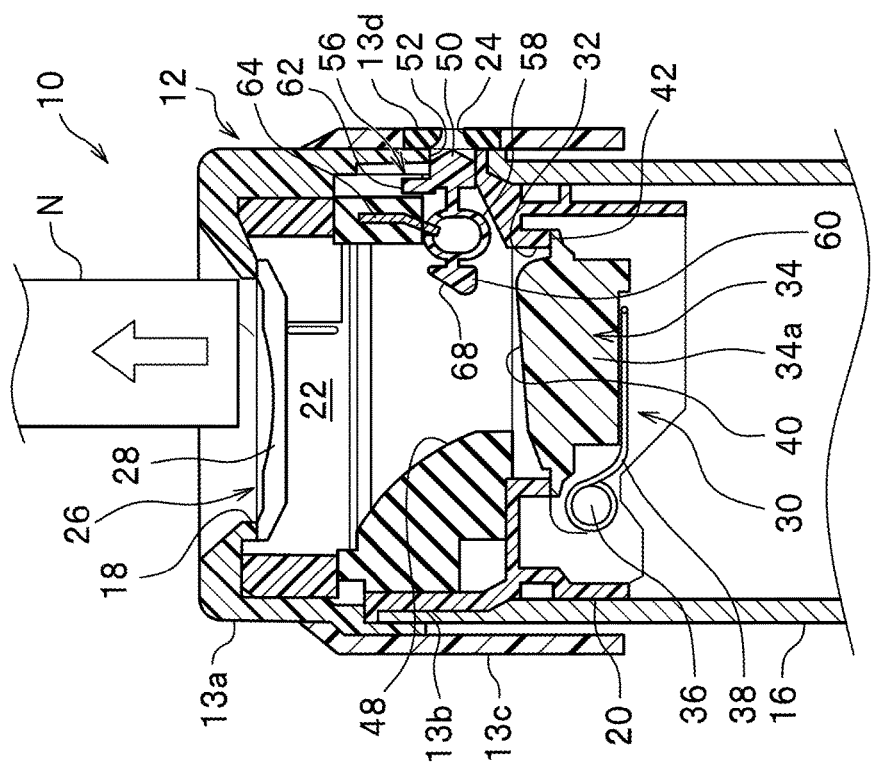
FIGS. 2A and 2B are partially omitted enlarged cross-sectional views of the structure used for describing operation of a closing mechanism shown in FIG. 1.

An embodiment of the invention will be described in detail with reference to the drawings properly. FIG. 1 is a partially omitted enlarged cross-sectional view of a fuel filler structure according to an embodiment of the invention.

A fuel filler part (not shown) is provided at a given portion of a vehicle. The fuel filler part includes a lid (not shown) in a substantially disc shape and a hinge (not shown) on which the lid can be pivotally opened and closed. The lid keeps the lid closed by a lock mechanism and is unlocked by a release lever provided in a passenger compartment. The lid is turned by a given angle on the hinge as a rotation center so as to be switched from a closed state to an open state.

As shown in FIG. 1, a fuel filler structure 10 according to the embodiment of the invention is used for the fuel filler part (not shown), and includes a cylindrical portion (cylinder) 12 and a feeding pipe 16 (fuel feeding pipe) through which a fuel supplied from the cylindrical portion 12 is fed to a fuel tank 14. The cylindrical portion 12 includes a fueling port (opening) 18 for inserting a nozzle N (see FIGS. 2A and 2B) of a fueling gun and a connecting port 20 connected to the feeding pipe 16 for supplying the fuel into the fuel tank 12.

The cylindrical portion 12 includes: a first outer member 13a that forms a fueling port 18; a second outer member 13b that is integrally assembled with the first outer member 13a and forms a connecting port 20; and a collar member 13c that is fitted on the first outer member 13a and has a drain hole 24 to be described later. Note that the drain hole 24 is formed with a seal member 13d such as rubber that is mounted around the hole of the collar member 13c.

An inner space 22 through which the fueling port 18 communicates with the connecting port 20 is defined along an axial direction of the cylindrical portion 12 between the fueling port 18 and the connecting port 20. The drain hole 24 through which the inner space 22 communicates with outside is defined at the middle of the cylindrical portion 12 (collar member 13c). The drain hole 24 is a through hole. The drain hole 24 is used for discharging water, dust and the like that have entered into the inner space 22 of the cylindrical portion 12 to the outside.

A first flap mechanism (flap mechanism) 26 is arranged near the fueling port 18 of the cylindrical portion 12. The first flap mechanism 26 opens and closes the fueling port 18 at the time of refueling. For example, as will be described later, when the nozzle N of the fueling gun is inserted through the fueling port 18, an end of the nozzle N presses the first flap mechanism 26 to open the fueling port 18.

The first flap mechanism 26 includes first shutter members 28, 28 located at right and left for opening and closing the fueling port 18 of the cylindrical portion 12 (only one of the shutter members is shown in FIG. 1). The first shutter members 28, 28 has a hinged double door structure in which the shutter members 28, 28 move to open from the center to the sides when the nozzle N comes in contact with the shutter members 28, 28, so that the nozzle N can pass therethrough.

A second flap mechanism (another flap mechanism) 30 is arranged near the connecting port 20 of the cylindrical portion 12. The second flap mechanism 30 opens and closes "an opening 32 near the connecting port 20" during refueling. For example, as will be described later, when the nozzle N of the fueling gun is inserted through the fueling port 18, the end of the nozzle N presses the second flap mechanism 30 to open the opening 32 near the connecting port 20 (see FIG. 3B). The second flap mechanism 30 is arranged near the connecting port 20 of the cylindrical portion 12, to securely prevent dust and the like from entering into the feeding pipe 16 and the fuel tank 14.

The second flap mechanism 30 includes: a second shutter member 34 for opening and closing the opening 32 near the connecting port 20; a hinge 36 that is a rotating shaft of the second shutter member 34; and a spring 38 that is attached on the hinge 36 to bias the second shutter member 34 so as to be closed.

The second shutter member 34 has a shutter body 34a. The shutter body 34a includes a contact face 40 on which the end of the nozzle N of the fueling gun contacts. The shutter body 34a is arranged so as to be rotatable about the hinge 36 that is arranged at one side of the main body 34a. The second shutter member 34 rotates for switching to close the opening 32 near the connecting port 20 by contacting a seat portion 42 that is arranged at a lower portion of the opening 32 near the connecting port 20 and to open the opening 32 near the connecting port 20 by separating from the seat portion 42.

An annular member 44 that is mounted on an inner wall of the first outer member 13a to serve as a spacer, and an inner radial member 46 made of rubber that is mounted on an inner wall of the second outer member 13b are are arranged continuously in an axial direction respectively between the fueling port 18 and the connecting port 20 of the cylindrical portion 12. Inside the inner radial member 46, a guide portion 48 is formed. The guide portion 48 gradually bulges radially inward of the cylindrical portion 12 (second outer member 13b) in a direction from the fueling port 18 to the connecting port 20.

The guide portion 48 guides the nozzle N inserted through the fueling port 18 toward a nozzle contact portion 60 (rightward in FIG. 1) to be described later so as to bring the nozzle N into contact with the nozzle contact portion 60. Further, the guide portion 48 allows the nozzle N to securely contact with the nozzle contact portion 60, for example, irrespective of an insertion angle of the nozzle N through the fueling port 18.

The first outer member 13a includes a restricting portion 52 that restricts a displacement of a valve body 50 to be described later toward the drain hole 24. The opening 32 near the connecting port 20 and the seat portion 42 are formed in the second outer member 13b.

A drain hole switching valve 54 that opens and closes the drain hole 24 is arranged between the fueling port 18 and the drain hole 24. The drain hole switching valve 54 has a closing mechanism 56 that is pressed by the nozzle N inserted through the fueling port 18 to close the drain hole 24.

The closing mechanism 56 has the valve body (valve) 50, an elastic portion 58, and the nozzle contact portion 60, which are integrally formed via connecting portions. The valve body 50, the elastic portion 58, and the nozzle contact portion 60 are integrally formed of a resin material or a rubber material, for example, and are arranged so as to be displaced integrally.

The valve body 50 is formed in a composite shape in which a shape having a rectangle in cross section and a shape having a chevron in cross section are combined, and is arranged most closely to the drain hole 24. The drain hole 24 is closed by the valve body 50 being displaced (advanced) toward the drain hole 24 (See FIG. 2A). In addition, the valve body 50 includes a stopper 62 that restricts the displacement of the valve body 50 toward the drain hole 24. The stopper 62 contacts the restricting portion 52 of the first outer member 13a, so that the valve body 50 is restricted so as not to be further displaced toward the drain hole 24.

The elastic portion 58 includes a hollow body in a circular cross section having an elastic force, and a notched portion 66 through which an end of a plate spring member 64 is inserted and engaged therewith. The elastic portion 58 formed between the valve body 50 and the nozzle contact portion 60 suitably absorbs, for example, vibration when the nozzle N contacts the nozzle contact portion 60 and vibration when the valve body 50 is seated on the drain hole 24. As a result, the drain hole 24 is appropriately closed by the valve body 50.

The nozzle contact portion 60 is arranged on the opposite side of the elastic portion 58 from the valve body 50, and is in a chevron shape having a substantially triangular cross section. Further, the nozzle contact portion 60 includes an inclined face 68 that rises to project in the axial direction from a portion closest to the fueling port 18 toward the connecting port 20.

When the nozzle N is inserted through the fueling port 18, the nozzle contact portion 60 is contacted with an outer wall of the nozzle N on the inclined face 68 to displace the whole valve body 50 including the nozzle contact portion 60 toward the drain hole 24 by a pressing force of the nozzle N. Accordingly, the valve body 50 that is integrally displaced with the nozzle contact portion 60 is seated on the seal member 13d to close the drain hole 24.

Figure 3A:
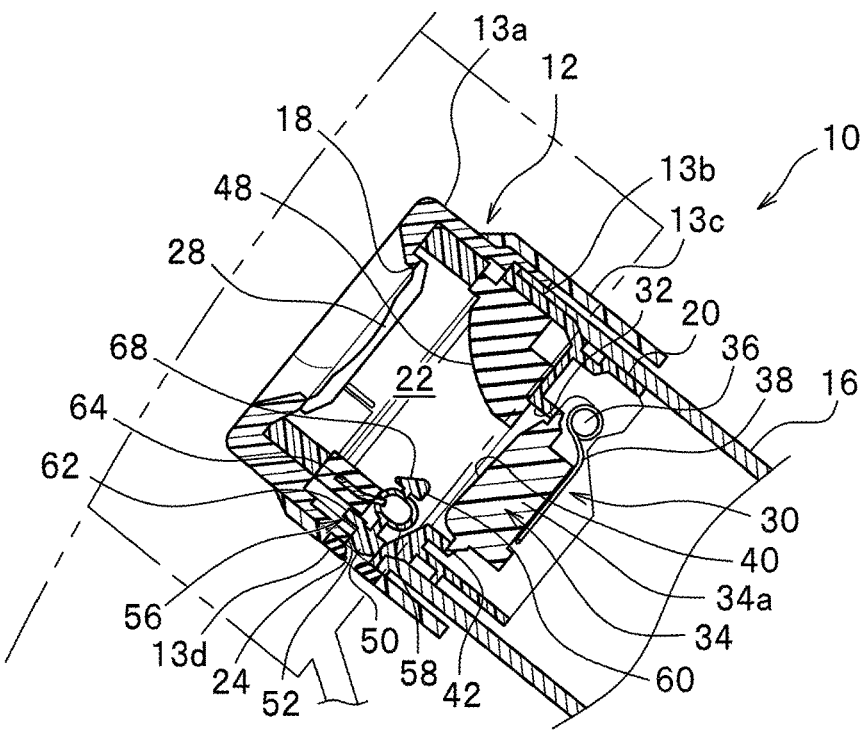
FIG. 3A is a cross-sectional view of the structure of the embodiment in a state before refueling and FIG. 3B is a cross-sectional view os the same in a state of a suction mechanism sucking volatile fuel during refueling.
Figure 3B:
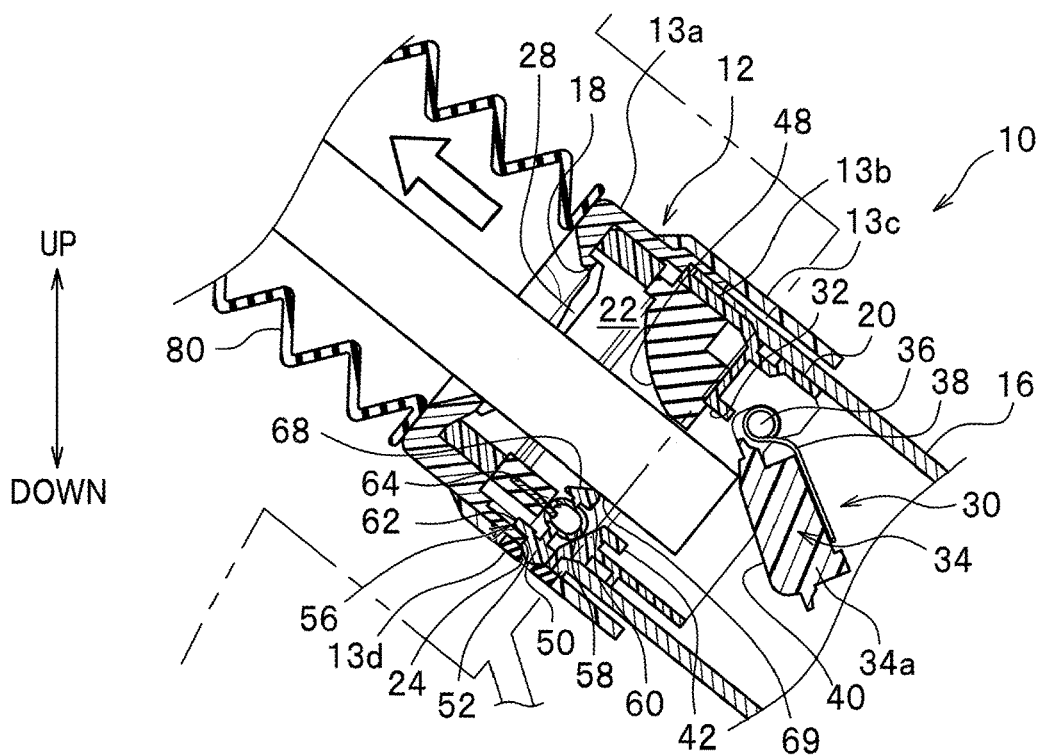

Further, the nozzle contact portion 60 is preferably arranged to contact a lower face portion 69 at the end of the nozzle N of the fueling gun (See FIG. 3B). For example, during refueling, the lower face portion 69 at the end of the nozzle N of the fueling gun is leaned to the fuel filler structure 10. Then, the nozzle contact portion 60 is arranged to contact the lower face portion 69 at the end of the nozzle N, so that the valve body 50 is securely seated on the seal member 13d under the weight of the nozzle N to close the drain hole 24. Note that "up and down" in FIG. 3B indicates the vertical direction.

The plate spring member 64 is held in a plate spring holding portion 70 formed in the inner radial member 46. The plate spring holding portion 70 is a slit that is formed in the inner radial member 46, in which the plate spring member 64 is held in the slit. The plate spring member 64 is formed of a belt-shaped rectangular body, and includes a held-in-slit portion 72 that is fitted into the slit and an engaged portion 74 that is bent with respect to the clamped portion 72 and extends into the notched portion 66 of the elastic portion 58.

Figure 2B:
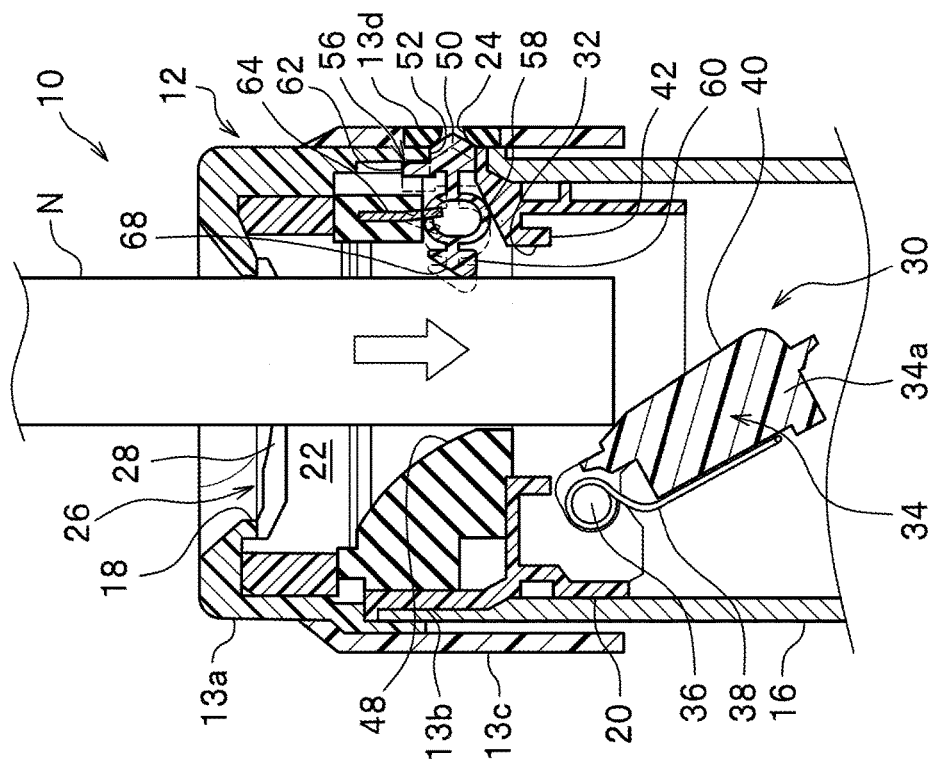

In a normal state other than refueling, the plate spring member 64 biases the drain hole switching valve 54 in a direction where the drain hole switching valve 54 is opened (where the drain hole 24 is opened) (see FIG. 2B).

The fuel filler structure 10 according to the embodiment is basically configured as described above. Operation and effects thereof will be described below. FIGS. 2A and 2B are partially omitted enlarged cross-sectional views of the structure used for describing the operation of the closing mechanism 56 shown in FIG. 1. Hereinbelow, the operation of the closing mechanism 56 will be explained in detail.

As shown in FIG. 1, in the normal state other than refueling, the valve body 50 is separated from the seal member 13d by a spring force of the plate spring member 64, so that the internal space 22 communicates with outside through the drain hole 24.

In the embodiment, in the normal state other than refueling, the drain hole switching valve 54 is opened to open the drain hole 24 (see FIG. 2B). As a result, in the embodiment, in the normal state, water, dust and the like entering into the inner space 22 are discharged outside through the drain hole 24 that is in communication with the outside.

When the nozzle N of the fueling gun is inserted through the fueling port 18, the end of the nozzle N presses the right and left first shutter members 28, 28 downward. As a result, the right and left first shutter members 28, 28 are opened from the center to both sides, to allow the nozzle N to be inserted therethrough. Thus, the fueling port 18 is kept to be open.

Further, the nozzle N inserted through the fueling port 18 is further inserted toward the connecting port 20 guided by the guide portion 48. Then, the outer wall of the nozzle N contacts the inclined face 68 of the nozzle contact portion 60. At this moment, the nozzle contact portion 60 is pressed toward the drain hole 24 by the pressing force of the nozzle N, so that the nozzle contact portion 60, the elastic portion 58 and the valve body 50 are integrally displaced toward the drain hole 24. Accordingly, the valve body 50 is seated on the seal member 13d to close the drain hole 24 (see FIG. 2A). Note that the displacement of the valve body 50 is restricted by the stopper 62 contacting the restricting portion 52.

As shown in FIG. 2B, when refueling is completed and the nozzle N is pulled out of the fueling port 18, the valve body 50, the elastic portion 58 and the nozzle contact portion 60 are integrally displaced so as to be separated from the drain hole 24 by the spring force of the plate spring member 64. Thus, the valve body 50 returns to the original position separated from the seal member 13d, to open the drain hole 24.

In order to inhibit volatile fuel from being released into an ambient air during refueling, a case will be described where a refueling device having a suction mechanism is used for refueling. The suction mechanism sucks the volatile fuel into a tank at a gas station during refueling.

Figure 4A:
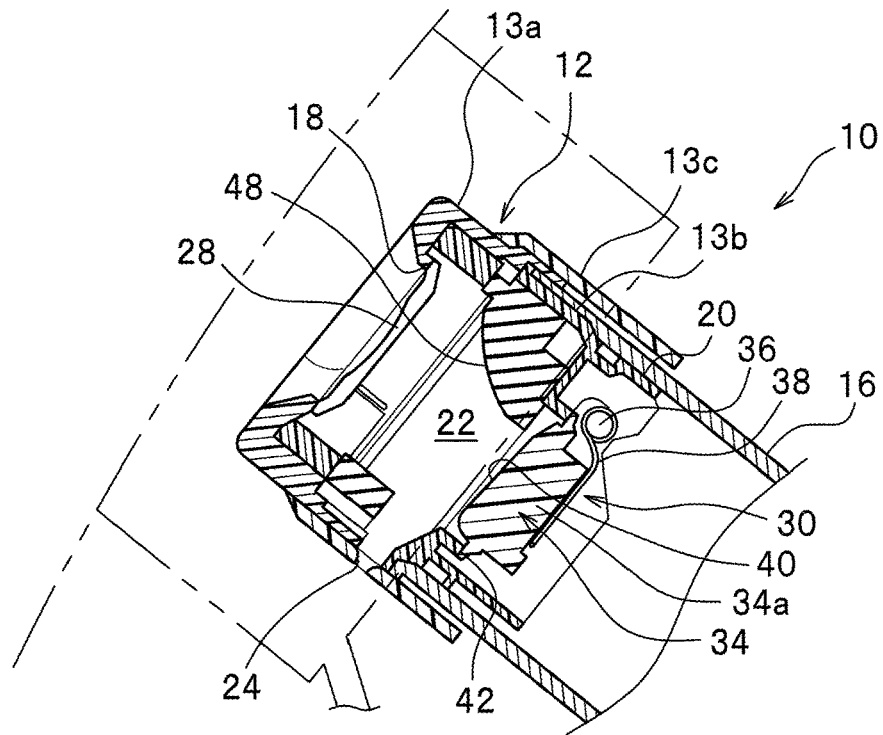
FIG. 4A is a cross-sectional view of a structure of a comparative example devised by the applicant in a state before refueling and FIG. 4B is a cross-sectional view of the same in a state of the suction mechanism sucking volatile fuel during refueling.
Figure 4B:
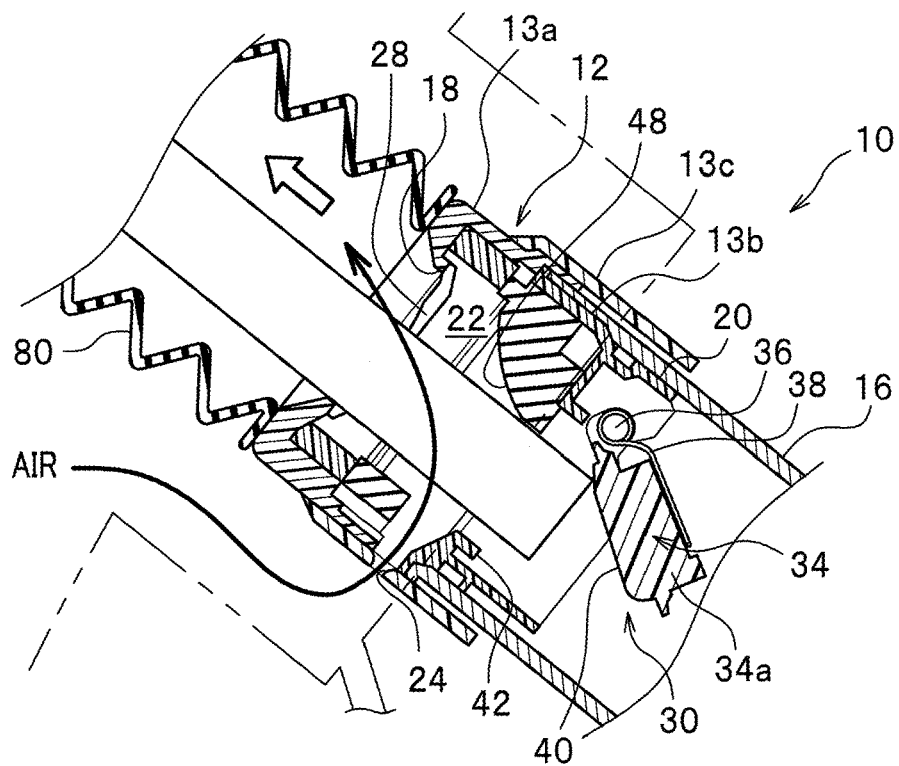

FIG. 3A is a cross-sectional view of the structure of the embodiment in a state before refueling and FIG. 3B is a cross-sectional view of the same in a state of the suction mechanism during refueling. FIG. 4A is a cross-sectional view of a structure of a comparative example devised by the applicant in a state before refueling and FIG. 4B is a cross-sectional view of the same in a state of the suction mechanism sucking volatile fuel during refueling. In FIGS. 3B and 4B, a reference numeral 80 indicates a rubber bellows that covers the nozzle N.

The comparative example devised by the applicant has the same structure as the embodiment except the drain hole switching valve 54 (including the closing mechanism 56) arranged in the embodiment. Then, in the comparative example, the same elements as those in the embodiment are denoted by the same reference numerals, and a detailed description thereof will be omitted.

In the comparative example, when refueling is performed by a fueling device having a suction mechanism that sucks volatile fuel during refueling, the ambient air is simultaneously sucked through the drain hole 24 in communication with the outside. This may possibly decrease efficiency of sucking volatile fuel (see a hollow arrow in FIG. 4B).

In the embodiment, as shown in FIG. 3A, during the normal state other than refueling, the drain hole 24 is opened. In contrast, during refueling, the closing mechanism 56 of the drain hole switching valve 54 is activated, and the valve body 50 is seated on the seal member 13d to close the drain hole 24 (see FIG. 3B).

As a result, in the embodiment, in a case where the refueling device having the suction mechanism to suck the volatile fuel is used for refueling, the drain hole 24 is kept to be closed by the closing mechanism 56. This suitably avoids efficiency of sucking volatile fuel being decreased during refueling. As a result, in the embodiment, as compared with the comparative example, sucking amount of the volatile fuel during refueling is increased (see a hollow arrow in FIG. 3B).

Further, in the embodiment, the nozzle N that is inserted through the fueling port 18 directly contacts the nozzle contact portion 60 to displace the valve body 50 during refueling, so as to close the drain hole switching valve 54. In the embodiment, the drain hole switching valve 54 is reliably closed in such a configuration. Still further, as compared with a case where an indirect mechanism is used that displaces the valve body 50 without being affected by the pressing force of the nozzle N, the number of parts is reduced to decrease the manufacturing cost.

Yet further, in the embodiment, the nozzle contact portion 60 includes the inclined face 68 that rises in the axial direction from a position closest to the fueling port 18 toward the connecting port 20. When the nozzle N is inserted, the inclined face 68 prevents the nozzle N from being caught at the nozzle contact portion 60. Accordingly, the nozzle N smoothly and steadily contacts the nozzle contact portion 60.

What is claimed is:

1. A fuel filler structure capable of use with a fuel feeding pipe comprising:
    a cylinder that includes an opening for inserting a nozzle of a fueling gun and a connecting port configured to connect to the fuel feeding pipe for supplying fuel to a fuel tank;
    a flap mechanism that is arranged over the opening of the cylinder and configured to open the opening when the nozzle is inserted;
    a drain hole that is formed through the cylinder, an inside of the cylinder is in communication with an outside of the cylinder through the drain hole; and
    a drain hole switching valve that opens and closes the drain hole;
    wherein the drain hole switching valve has a closing mechanism that is configured to be pressed by the nozzle when the nozzle is inserted through the opening, so that the drain hole is closed, and the closing mechanism has a nozzle contact portion configured to abut on an outer wall of the nozzle, a hollow elastic portion, and a valve, wherein the nozzle contact portion, the hollow elastic portion, and the valve are integrally formed with one another with the hollow elastic portion being interposed between the nozzle contact portion and the valve, and the hollow elastic portion is configured to absorb vibration when: the nozzle contacts the drain hole switching valve; and the valve is seated on the drain hole.

2. The fuel filler structure capable of use with the fuel feeding pipe according to claim 1,
    wherein the nozzle contact portion is configured to be displaced toward the drain hole by a pressing force of the outer wall of the nozzle when the nozzle is inserted through the opening, so that the drain hole is closed by the valve.

3. The fuel filler structure capable of use with the fuel feeding pipe according to claim 1,
    wherein the nozzle contact portion includes an inclined face that rises in an axial direction from the opening toward the connecting port.

4. The fuel filler structure capable of use with the fuel feeding pipe according to claim 2,
    wherein the nozzle contact portion includes an inclined face that rises in an axial direction from the opening toward the connecting port.

5. The fuel filler structure capable of use with the fuel feeding pipe according to claim 1, further comprising a second flap mechanism that is arranged near the connecting port of the cylinder,
    wherein the second flap mechanism is configured to be pressed by the nozzle when the nozzle is inserted through the opening, to open an opening near the connecting port.

* * * * *